May 15, 1956      E. LENK      2,745,939
SOLDERING IRON
Filed May 14, 1954
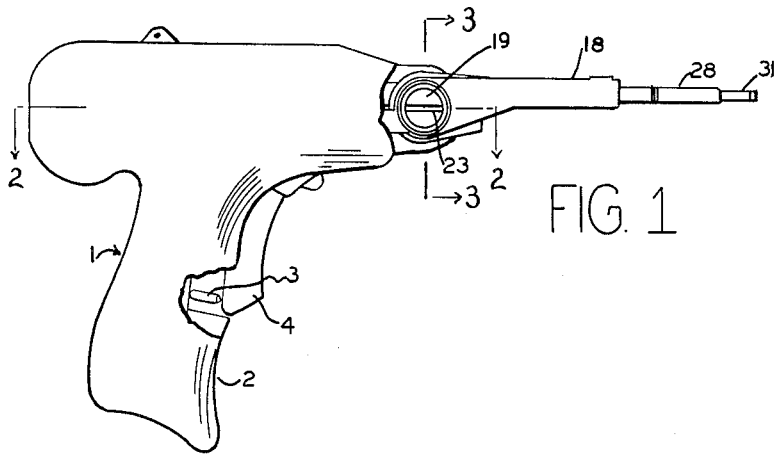
FIG. 1
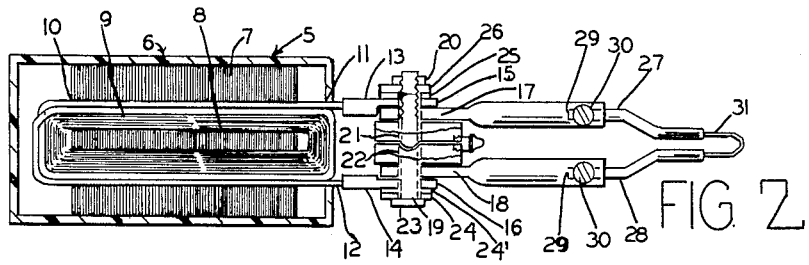
FIG. 2
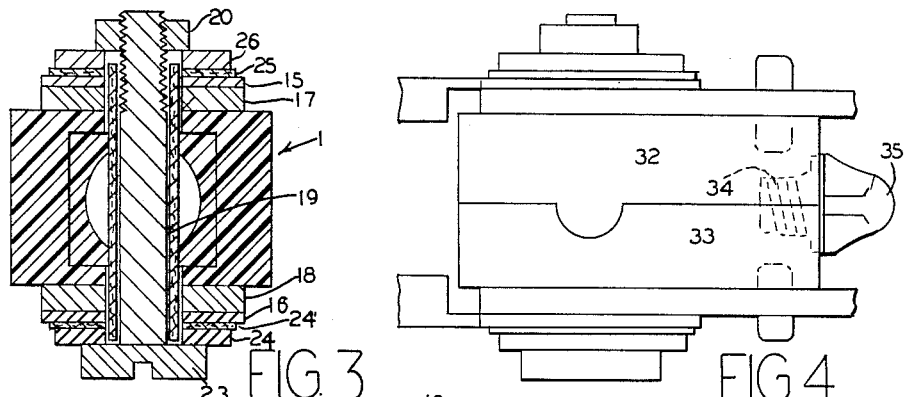
FIG. 3
FIG. 4
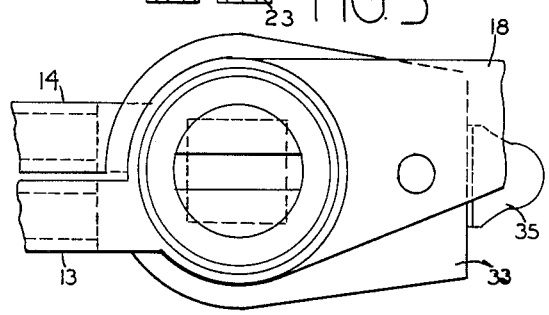
FIG. 5
INVENTOR.
BY Edgar Lenk
Ezekiel Wolf
his Attorney.

2,745,939

SOLDERING IRON

Edgar Lenk, Waltham, Mass., assignor to Lenk Manufacturing Company, Boston, Mass., a corporation of Kentucky Application May 14, 1954, Serial No. 429,917

5 Claims. (Cl. 219—26)

The present invention relates to a soldering iron and more particularly of the type where it is desired to provide a soldering tip which generates heat very rapidly so that the iron may be picked up and used without waiting for it to heat up. Such a type of soldering iron is shown in the Weller Reissue Patent No. 23,619, and in the Caliri Patent No. 2,560,552.

For the most part the soldering tips have been constructed of copper which has a substantially low electrical resistance and therefore will concentrate a large current capacity in a small cross sectional area for the same linear resistance as other metals as for instance, German silver or Nichrome which is a nickle chromium alloy, all of which have substantially high specific resistances.

While copper tips will carry a large current for the same cross sectional area, nevertheless it has been found that there are specific disadvantages to the use of a copper conducting soldering tip. In the first place since the heating is proportional to the resistance times the current squared, an alloy tip for the same current capacity will provide more heat and therefore will heat up more quickly than a conductive copper tip. In addition to this while the resistivity of copper increases with the temperature, the characteristic curve is not as good as with other metals and further since the heat of the copper tip is quickly dissipated it is not as constant as the use of some other materials such as alloy and iron which has been found to be more desirable for a quick heating soldering iron.

A further feature of the present invention is that the soldering iron is so constructed to provide a swivel adjustment by means of which the soldering tip may be angularly adjusted in position for the purpose of soldering.

A further feature of the present invention with the use of the soldering tip in accordance herewith, is that the heat is self regulating and rises to a temperature which tends to be maintained while the iron is being used.

A further feature of the present invention is that the material used in the soldering tip will more easily withstand higher temperatures than the ordinary copper tip and will hold its shape without becoming deformed in any way, even though the tip may become quite hot on extended use.

A further feature of the present invention is the incorporation of a light in the iron between the two electrodes or arms to which the soldering tip is joined which directly illuminates the work upon which the operations are being performed.

Further and other features of the present invention will be more specifically brought out and understood from the description in the specification set forth below taken in connection with the drawings, in which:

Figure 1 shows an elevation of the soldering iron with portions shown in fragmentary sections.

Figure 2 shows a section taken substantially on the line 2—2 of Figure 1.

Figure 3 shows a section taken along the line 3—3 of Figure 1.

Figure 4 shows an enlarged fragmentary section as viewed from the top of Figure 1, and Figure 5 shows a side elevation of the portion shown in Figure 4.

In the arrangement indicated in the drawings, the soldering iron 1 may be formed with a pistol handle grip 2 with a switch 3, mounted therein pivoted and operating as a trigger 4 which when squeezed will operate the switch to send current through the soldering iron in the manner which will be described below. The electrical element of the soldering iron itself comprises a closed core transformer 5, which is made up of a series of closed laminations 7 having a surrounding shell 6 and a center core 8. The primary winding 9 is wound about the central core 8 as indicated in Figure 2 and about the primary winding is wound a secondary winding 10 of a few turns of copper wire. The terminals of the secondary winding 10 are brought out at 11 and 12 and connected to terminal rods 13 and 14 respectively, which have at their ends a disc shaft terminal connection as indicated by the elements 15 and 16 respectively. These terminal elements 15 and 16 may be in the form of comparatively large copper discs and may be held in contact with the terminal plates of the connecting electrodes 17 and 18 extending to the soldering tip as will be presently described.

The disc 16 is held in contact with the plate 18 by a swivel screw 19 and lock nut 20, the shaft 21 of the screw 19 being insulated by means of a collar 22 which is slid over the shaft 21. Just under the head 23 of the screw 19 is an iron washer 24 and under this is a fiber washer 24' by means of which pressure is exerted on the element 16 to hold it in close contact with the terminal plate of connecting electrode 18. At the other end of the screw 19 just beyond the terminal element 15 is a fiber washer 25 and in back of this is an iron washer 26 against which the lock nut is brought up tightly to pivot the whole assembly comprising the terminals 15 and 16 of the secondary of the transformer and the connecting electrodes or arms 17 and 18 which carry the current to the soldering tip. The connecting elements 17 and 18 are made of copper or brass castings, rounded, squared, or having other shape sections at their ends into which copper wire conductors 27 and 28 are inserted in end recesses 29 in the elements 17 and 18. Set screws 30 thread into the elements 17 and 18 to hold the conductors 27 and 28 firmly in place. The conductors 27 and 28 are made of copper and have pressed or welded at their ends a soldering tip 31 which is formed in the shape of a V-shaped band secured at the open ends of the V into the copper conductors 27 and 28. The soldering tip 31 is preferably made of an iron strap or wire of substantially rectangular cross section on a section taken perpendicular to the plane of the V. The tip may be substantially pure iron or iron with a small amount of alloy, such as nickel or some other suitable metal. This not only provides a very strong soldering tip, but one which will not be deformed under the ordinary soldering temperatures which may be incurred. The tip 31 may be pretinned if desired, and if pretinned will hold its tinning over a very great period of time without material deterioration.

Between the connecting elements 17 and 18 on the swivel shaft 21, there may be mounted the lamp socket comprising two, half "Bakelite" elements 32 and 33, providing a cavity 34 to receive a small light 35, which may have suitable connections to the primary circuit of the transformer for illuminating the lamp positioned between the copper connectors 27 and 28 to the soldering tip.

The swivel screw 19 may be maintained in a well tightened position and still permit swinging of the connecting arms 17 and 18 to direct the soldering tip in any desired direction. This is particularly true because of the large surface area between the conductors 17 and 18 and the terminal elements 15 and 16 to the secondary of the transformer.

Having now described my invention, I claim:

1. A quick heating soldering iron comprising a step-down transformer formed with a closed core having a primary coil of a large number of fine turns wound about the central core element and a secondary coil of only a few turns of coarse wire wound over the primary coil a pair of terminal plates parallel to and spaced from one another and electrically connected to the end of the secondary coil, a soldering tip of small cross section area having arms extending from the tip in the same direction terminating in plate elements in electrical contact with and pivoted in face to face relation one each with the terminal plates at the ends of said secondary coil, whereby the position of said soldering tip may be angularly adjusted about the point of pivot.

2. A quick heating soldering iron comprising a step-down transformer having a primary coil of a large number of fine turns and a secondary coil of a few larger cross section turns having large current carrying capacity, a pair of terminal rods electrically connected one to each end of said secondary and having parallel spaced apart terminal connectors, connecting electrodes electrically connected to each of said rods by terminal plates bearing against the terminal connectors, a swivel screw insulated from but connecting the terminal connectors and plates in pivotal relationship and a soldering point of substantially higher resistance material than the electrodes formed as a V-shaped band and having its ends electrically connected to the ends of said electrodes, said soldering tip being of substantially smaller cross sectional area than the cross sectional area of said electrodes.

3. A quick heating soldering iron comprising a step-down transformer having a primary coil of a large number of fine turns and a secondary coil of a few large cross section turns having large current carrying capacity, a pair of terminal electrodes electrically connected one to each end of said secondary, means mounting said terminal electrodes in a swivel joint insulated and spaced from one another on the same axis, copper conductors electrically connected to the ends of the electrodes, and a soldering tip having a substantially higher specific resistance than said conductors and of substantially smaller cross sectional area rigidly supported by said conductors.

4. A quick heating soldering iron comprising a step-down transformer having a primary coil of a large number of fine turns and a secondary coil of a few large cross section turns and having large current carrying capacity, a pair of terminal rods connected one to each end of said secondary and having spaced apart and parallel terminal connector plates, a pair of connecting electrodes electrically connected to the terminal rods and having terminal plates in face to face relation with the connector plates of the terminal rods, a swivel screw passing through each of the plates providing a pivotal connection between the rods and the electrodes, and a soldering tip of an iron alloy having a substantially higher specific resistance than said electrodes and of substantially smaller cross sectional area rigidly supported by said electrodes.

5. A quick heating soldering iron comprising a step down transformer having a primary coil of a large number of fine turns and a secondary coil of a few large cross section turns and having large current carrying capacity, a pair of terminal rods electrically connected to the ends of the secondary coil, a pair of connecting electrodes pivotally mounted on the ends of the terminal rods by a swivel screw, copper conductors rigidly supported by the electrodes, a soldering tip made of an iron alloy and having a substantially higher specific resistance than said copper conductors and of substantially smaller cross sectional area rigidly supported by said conductors, and a light source mounted on the swivel screw and movable with the electrodes.

References Cited in the file of this patent
UNITED STATES PATENTS

| | | |
|---|---|---|
| 483,050 | Fitzmaurice | Sept. 20, 1892 |
| 1,899,220 | Wappler | Feb. 28, 1933 |
| 2,196,171 | Arnesen | Apr. 9, 1940 |
| 2,439,296 | Hawkins | Apr. 6, 1948 |
| 2,501,192 | Scholler | Mar. 21, 1950 |
| 2,570,762 | Caliri | Oct. 9, 1951 |
| 2,588,531 | Johnson | Mar. 11, 1952 |
| 2,593,947 | Weller | Apr. 22, 1952 |